US012670499B2

(12) United States Patent
Arora et al.

(10) Patent No.: US 12,670,499 B2
(45) Date of Patent: Jun. 30, 2026

(54) eSIM ENABLED UNIQUE CARD AS A DEVICE FOR FI AGNOSTIC TRANSACTIONS

(71) Applicant: Bank of America Corporation, Charlotte, NC (US)

(72) Inventors: Saurabh Arora, New Palam Vihar (IN); Sandeep Kumar Chauhan, Miyapur (IN); Saurabh Garg, Faridabad (IN); Chinmay Barhale, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 18/660,422

(22) Filed: May 10, 2024

(65) Prior Publication Data

US 2025/0348881 A1     Nov. 13, 2025

(51) Int. Cl.
  *G06Q 20/34*     (2012.01)
  *G06Q 20/40*     (2012.01)
(52) U.S. Cl.
  CPC ......... *G06Q 20/4016* (2013.01); *G06Q 20/34* (2013.01)
(58) Field of Classification Search
  CPC ............. G06Q 20/341; G06Q 20/4016; G06Q 20/3224; G06Q 30/0261; G06Q 20/40; G06Q 20/4015
  See application file for complete search history.

(56) References Cited

U.S. PATENT DOCUMENTS

| | | | |
|---|---|---|---|
| 10,142,881 | B2 | 11/2018 | Link, II |
| 10,997,584 | B2 | 5/2021 | Cho et al. |
| 11,012,430 | B1 | 5/2021 | Hufker et al. |
| 11,116,017 | B2 | 9/2021 | Khanduri |
| 11,875,321 | B1 | 1/2024 | Singh et al. |
| 11,966,904 | B1 * | 4/2024 | Sanagavarapu ........... G06F 8/65 |

(Continued)

FOREIGN PATENT DOCUMENTS

| | | |
|---|---|---|
| BR | 112021016159 A2 | 10/2021 |
| CN | 107924515 A | 4/2018 |

(Continued)

*Primary Examiner* — Hao Fu
(74) *Attorney, Agent, or Firm* — Banner & Witcoff, Ltd.

(57)     ABSTRACT

Systems and methods are disclosed for a card device that integrates eSIM technology and Distributed Ledger Technology (DLT) to provide a secure, flexible solution for handling transactions across multiple financial institutions (FIs). The card system associates a single, secure eSIM-enabled card with multiple accounts and FIs, enhancing transaction security and efficiency. The card, embedded with an eSIM, allows dynamic association with customer details and FI accounts, ensuring each transaction is authenticated on a decentralized platform without sharing sensitive information. The system employs DLT for logging transaction details and managing transaction metadata centrally, providing fraud detection and real-time settlement capabilities. The invention improves security by using cryptographic methods and real-time monitoring including geo-locating of cards and clones to prevent unauthorized access and fraud, addressing the need for a secure, multi-institution financial transaction platform.

17 Claims, 7 Drawing Sheets

(56) References Cited

U.S. PATENT DOCUMENTS

| | | | |
|---|---|---|---|
| 2015/0095239 A1* | 4/2015 | Specogna | G06Q 20/405 |
| | | | 705/72 |
| 2016/0253651 A1 | 9/2016 | Park et al. | |
| 2018/0225671 A1 | 8/2018 | Brown | |
| 2018/0232718 A1 | 8/2018 | Brown | |
| 2018/0232740 A1 | 8/2018 | Brown | |
| 2018/0268476 A1 | 9/2018 | Brown | |
| 2018/0341937 A1* | 11/2018 | Kim | G06Q 20/3829 |
| 2020/0351651 A1 | 11/2020 | Koo et al. | |
| 2021/0264429 A1* | 8/2021 | Kramme | G06Q 30/0185 |
| 2022/0207500 A1 | 6/2022 | Gawlas et al. | |
| 2023/0161849 A1 | 5/2023 | Chih et al. | |
| 2023/0289808 A1 | 9/2023 | Kolchin | |
| 2023/0410087 A1 | 12/2023 | Hollander et al. | |
| 2025/0014018 A1* | 1/2025 | Oni | G05B 19/4099 |

FOREIGN PATENT DOCUMENTS

| | | | | |
|---|---|---|---|---|
| CN | 108173811 A | 6/2018 | | |
| CN | 113728609 A | 11/2021 | | |
| CN | 107408251 B | 1/2022 | | |
| CN | 107077671 B | 2/2022 | | |
| CN | 110020569 B | 3/2022 | | |
| CN | 113581127 B | 1/2023 | | |
| EP | 3062271 A1 | 8/2016 | | |
| EP | 3262584 A1 | 1/2018 | | |
| EP | 3376454 A1 | 9/2018 | | |
| EP | 3451263 A1 | 3/2019 | | |
| KR | 20160040022 A | 4/2016 | | |
| KR | 20170008645 A | 1/2017 | | |
| KR | 20170039642 A | 4/2017 | | |
| KR | 20170041465 A | 4/2017 | | |
| KR | 102577054 B1 | 9/2023 | | |
| WO | 2013039395 A1 | 3/2013 | | |
| WO | 2019191365 A1 | 10/2019 | | |
| WO | 2019191367 A1 | 10/2019 | | |
| WO | 2019191404 A1 | 10/2019 | | |
| WO | 2019191433 A1 | 10/2019 | | |
| WO | 2022199868 A1 | 9/2022 | | |
| WO | WO-2022214802 A1 * | 10/2022 | | H04W 12/04 |
| WO | 2022228059 A1 | 11/2022 | | |

* cited by examiner

Potential Fraud Identification and Mitigation Diagram

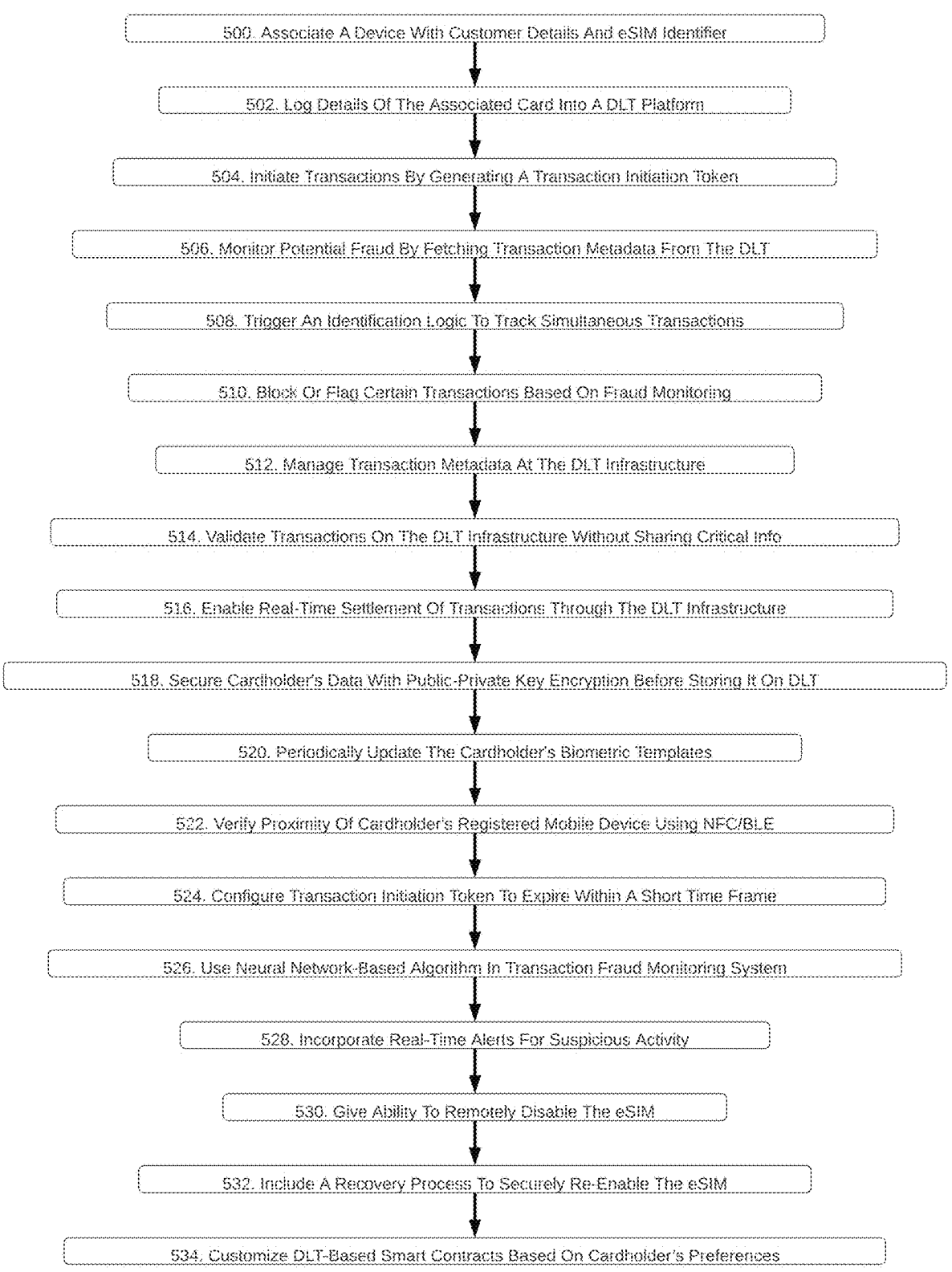

500. Associate A Device With Customer Details And eSIM Identifier

502. Log Details Of The Associated Card Into A DLT Platform

504. Initiate Transactions By Generating A Transaction Initiation Token

506. Monitor Potential Fraud By Fetching Transaction Metadata From The DLT

508. Trigger An Identification Logic To Track Simultaneous Transactions

510. Block Or Flag Certain Transactions Based On Fraud Monitoring

512. Manage Transaction Metadata At The DLT Infrastructure

514. Validate Transactions On The DLT Infrastructure Without Sharing Critical Info 516. Enable Real-Time Settlement Of Transactions Through The DLT Infrastructure 518. Secure Cardholder's Data With Public-Private Key Encryption Before Storing It On DLT 520. Periodically Update The Cardholder's Biometric Templates 522. Verify Proximity Of Cardholder's Registered Mobile Device Using NFC/BLE 524. Configure Transaction Initiation Token To Expire Within A Short Time Frame 526. Use Neural Network-Based Algorithm In Transaction Fraud Monitoring System 528. Incorporate Real-Time Alerts For Suspicious Activity 530. Give Ability To Remotely Disable The eSIM 532. Include A Recovery Process To Securely Re-Enable The eSIM 534. Customize DLT-Based Smart Contracts Based On Cardholder's Preferences

FIG. 5

Figure 6:
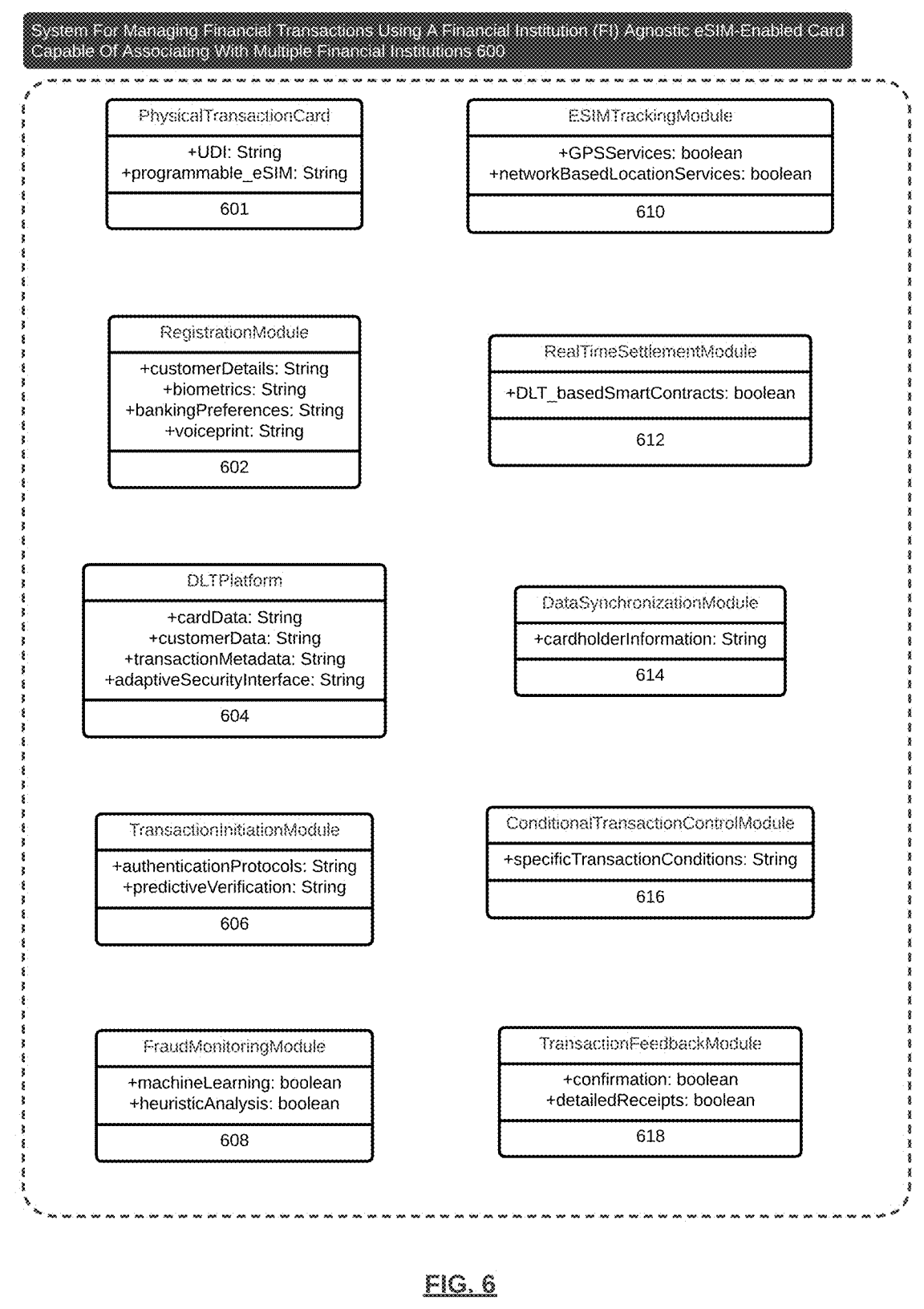

System For Managing Financial Transactions Using A Financial Institution (FI) Agnostic eSIM-Enabled Card Capable Of Associating With Multiple Financial Institutions 600

PhysicalTransactionCard

+UDI: String
+programmable_eSIM: String

601

ESIMTrackingModule

+GPSServices: boolean
+networkBasedLocationServices: boolean

610

RegistrationModule

+customerDetails: String
+biometrics: String
+bankingPreferences: String
+voiceprint: String

602

RealTimeSettlementModule

+DLT_basedSmartContracts: boolean

612

DLTPlatform

+cardData: String
+customerData: String
+transactionMetadata: String
+adaptiveSecurityInterface: String

604

DataSynchronizationModule

+cardholderInformation: String

614

TransactionInitiationModule

+authenticationProtocols: String
+predictiveVerification: String

606

ConditionalTransactionControlModule

+specificTransactionConditions: String

616

FraudMonitoringModule

+machineLearning: boolean
+heuristicAnalysis: boolean

608

TransactionFeedbackModule

+confirmation: boolean
+detailedReceipts: boolean

618

FIG. 6 eSIM ENABLED UNIQUE CARD AS A DEVICE FOR FI AGNOSTIC TRANSACTIONS

TECHNICAL FIELD

The present disclosure pertains to information security focusing on methods and systems devised to safeguard electronic transactions and protect data against unauthorized activities, thereby maintaining the integrity and confidentiality of transactions and, in particular, to an advanced geo-locating system for secure transactions, leveraging the integration of distributed ledger technology (DLT) and embedded secure elements like eSIMs to enhance transactional security across multiple platforms, accounts, and FIs. This invention specifically addresses the need for protecting data and ensuring the authenticity of transactions through robust, built-in security measures that prevent unauthorized access and fraud. By employing cryptographic techniques and real-time monitoring systems, the technology facilitates the secure management of transaction metadata and transaction authentication without compromising sensitive information.

DESCRIPTION OF THE RELATED ART

The traditional transaction system, which relies heavily on physical cards and varying institutional protocols, has long been plagued by security vulnerabilities and inefficiencies. Among the most pressing issues is the susceptibility of card transactions to fraudulent activities. Criminals can target the static nature of traditional cards to duplicate or forge them, allowing for unauthorized transactions at multiple locations simultaneously. This type of fraud not only leads to significant financial losses for consumers and institutions alike but also undermines trust in the financial system.

Adding to the complexity, consumers today often hold accounts with multiple financial institutions. Managing a separate card for each account complicates the consumer's experience and increases the risk of security breaches. Each card serves as a potential entry point for fraud, multiplying the consumer's exposure as they navigate through their transactional activities. This situation demands a streamlined solution that can consolidate these multiple relationships into a single, secure platform.

Moreover, the existing systems do not provide a unique identification mechanism that can be flexibly associated with multiple institutions while maintaining stringent security measures. The lack of such a mechanism not only hampers the user experience but also leaves a gap in the security framework that could be attacked by malicious actors. The ability to tie a single, secure identity to multiple financial accounts could dramatically simplify user management and enhance security, but such a solution has been elusive.

The current landscape also lacks adequate real-time fraud detection mechanisms that can operate across different banks and transactions seamlessly. Existing systems typically operate in isolation, making it difficult to detect patterns of fraud that span multiple financial institutions or geographic locations. This isolation also slows down the reaction time to potential fraud, often allowing fraudulent activities to proceed unchecked before they can be stopped.

A related issue is the delay in transaction processing and settlement that occurs due to the disjointed nature of financial systems. Each institution often uses its own proprietary system for handling transactions, leading to inefficiencies and delays as data is transferred between systems. These delays are not only inconvenient for customers but can also impact financial liquidity, affecting overall economic stability.

The need for a dynamic solution that can integrate seamlessly with multiple financial institutions and provide real-time data access and transaction processing is critical. Such a solution would need to be adaptable, secure, and capable of handling the complexities of modern financial ecosystems without compromising on speed or user convenience.

Further, the management of transaction metadata and the validation of transactions across different institutions without sharing sensitive information remains a major challenge. Ensuring the authenticity of transactions while maintaining customer privacy requires a sophisticated approach that traditional systems are not equipped to handle. The integrity of transaction data is paramount, and any system that can safeguard this data while facilitating easy and secure transactions would be a significant advancement.

Additionally, the ability to track and manage transactions on a granular level in real-time is an essential feature that current systems lack. Such capabilities would allow financial institutions to offer better service to their customers by providing up-to-date information and proactive management of accounts and transactions.

The industry's reliance on outdated technology and the slow adoption of innovations that can address these issues have left consumers demanding a more secure, efficient, and user-friendly solution. The persistent problems of fraud, inefficiency, and lack of integration across financial platforms have highlighted the need for a revolutionary change in how financial transactions are managed and secured.

The invention, therefore, addresses a long-felt and unmet need in the industry for a system that can consolidate multiple financial accounts across different institutions into a single, secure, and efficient platform. This solution not only promises to enhance the security and efficiency of financial transactions but also simplifies the management of financial relationships for consumers, offering a much-needed relief in an era where financial transactions are increasingly complex and global. This unmet need for a unified, secure transaction platform has been evident for years, and the arrival of a solution that can tackle these issues comprehensively is both timely and critical.

SUMMARY OF THE INVENTION

The disclosed invention presents a groundbreaking eSIM-enabled card system that significantly enhances the flexibility and security of managing financial transactions for various credit/debit accounts across various differing financial institutions (FIs). This inventive system utilizes Distributed Ledger Technology (DLT) to securely and efficiently handle financial transactions without being limited to any specific institution, providing a revolutionary approach to personal financial management.

At the core of this invention lies the eSIM-equipped card, an innovative departure from traditional bank cards. Unlike conventional cards linked to a single FI, this advanced card operates independently, able to dynamically connect with multiple bank accounts and institutions. Each card is embedded with an eSIM that serves as both a communication gateway and a geo-locating security measure, ensuring the card can securely interact with various banking systems without the physical limitations of traditional bank cards.

The system's architecture involves a secure registration process where each card's eSIM and its unique device ID are encrypted and securely linked to the cardholder's identity and bank accounts. This initial setup is critical as it establishes a secure and verifiable link that is recorded on a DLT platform. The decentralized nature of DLT ensures that all registration and transaction data are immune to tampering, thereby enhancing security and integrity.

Transactions are initiated by the cardholder in the usual manner but are processed in a fundamentally different way. When a transaction is initiated, the card uses its eSIM to establish a secure, encrypted communication channel with the bank's transaction processing system via the DLT network. This method allows for real-time transaction verification without exposing sensitive personal data or transaction details to potential security threats.

One of the key features of this system is its real-time location tracking capability, enabled by the eSIM within each card. This feature ensures that the physical presence of the card correlates with the location of the transaction, significantly reducing the possibility of fraudulent transactions occurring in different geographical locations simultaneously through the usage of clone or forged cards.

The transaction process itself is designed to ensure security and uniqueness. Each transaction is assigned a unique identifier and timestamp by the DLT system, which effectively prevents the possibility of fraud through the use of cloned or stolen card details. The system verifies each transaction against the stored credentials and only proceeds with authorization if the transaction is confirmed as legitimate.

Moreover, the system facilitates a seamless transaction experience by automating the verification and funds checking process. Once a transaction is authenticated, the system communicates with the bank to confirm fund availability and proceeds to authorize and complete the transaction swiftly, thereby reducing transaction times and enhancing user convenience.

This invention also introduces a centralized management system for card and transaction oversight, which operates through the DLT platform. This system enables the card to be used across different FIs without the need for multiple cards or frequent updates to transaction devices. It simplifies the user experience by providing a single point of access for managing transactions across various accounts and institutions.

In addition to physical card transactions, this technology can extend to wearable devices such as smartwatches and fitness bands. By integrating eSIM technology into these devices, the system allows for the execution of secure transactions without the need for a physical card, broadening the usability and convenience of the system.

The application of DLT in this system is a significant enhancement over traditional transaction processing methods, which typically rely on centralized, less secure, and sometimes outdated systems. The decentralized approach of DLT not only secures transactions but also ensures they are immutable once recorded, providing an additional layer of security and reliability.

The invention's use of eSIM technology also sets it apart from other digital payment solutions. Unlike mobile wallets or apps that are confined to specific devices or platforms, the eSIM card can interface directly with any transaction terminal, expanding its utility beyond smartphone-dependent solutions like Apple Pay or Google Wallet.

Furthermore, the versatility of this card system makes it a powerful tool for international travelers, who often face the challenge of managing multiple currencies and accounts. The system's ability to dynamically connect with various FIs and automatically handle currency conversions enhances convenience and reduces the need for multiple currency-specific cards.

Overall, the innovative eSIM-enabled card system described in the invention represents a significant leap forward in financial technology. It offers a secure, efficient, and user-friendly platform for managing financial transactions across a wide array of financial institutions and accounts. This system not only meets the current demands of the financial market but also anticipates future needs, providing a scalable and adaptable solution that could redefine how individuals interact with their financial resources on a global scale.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for managing financial transactions employs a financial institution (FI) agnostic eSIM-enabled card linked to multiple bank accounts across different financial institutions. This method entails associating a device equipped with a unique device identifier (UDI) and an embedded SIM (eSIM) with customer details, activating the card to enable financial transactions. It includes logging details of the newly associated card, such as the unique device number generated from the metadata of both the card and customer details, into a distributed ledger technology (DLT) platform for managing transactions collectively. Each transaction is initiated by generating a transaction initiation token following the authentication and authorization performed by the bank associated with the transaction. The method further involves monitoring potential fraud by retrieving transaction metadata from the DLT and independently authenticating each transaction to ensure its uniqueness and security. An identification logic is triggered to check if the same card device is being used for multiple transactions simultaneously, utilizing the eSIM's tracking capabilities embedded within the card. Based on the results from the fraud monitoring and identification logic, certain transactions are either blocked or flagged. Additionally, the method manages transaction metadata on the DLT infrastructure to support centralized audit capabilities, which aids in effective dispute management. It also ensures the validation of card transactions directly on the DLT infrastructure without sharing sensitive information from the respective banks, thus enhancing the security and privacy of the transactions. Finally, the method enables real-time settlement of transactions through the DLT infrastructure, which leads to faster payment processing and reduces transaction delays.

In some arrangements, a method for managing financial transactions utilizes a financial institution (FI) agnostic eSIM-enabled card associated with multiple bank accounts across different FIs. This method involves associating a device, equipped with a unique device ID, with customer details and an embedded SIM (eSIM) identifier, where the association activates the device-based card to enable transactions. The method also includes logging details of the newly associated card, such as the unique device number generated from the metadata of the card and customer details, into a distributed ledger technology (DLT) platform for shared transaction management. Each transaction is initiated by generating a transaction initiation token following authentication and authorization performed by the respective bank associated with the transaction on the same card. Potential fraud is monitored by fetching transaction metadata from the DLT and authenticating each unique transaction independently. An identification logic is triggered to determine if the same card device is being used for multiple transactions simultaneously, utilizing the eSIM tracking capability embedded within the card. Certain transactions are blocked or flagged based on results from the fraud monitoring and identification logic. The method also involves managing transaction metadata at the DLT infrastructure to enable centralized audit capabilities for effective dispute management. Furthermore, card transactions are validated on the DLT infrastructure without sharing critical information from respective banks, thereby enhancing security and privacy. Lastly, the method enables real-time settlement of transactions through the DLT infrastructure, leading to faster payment processing and reduced transaction delays.

In some arrangements, the method includes a cryptographic registration process that uses a public-private key encryption scheme to secure the cardholder's biometric and personal data before storing it on the DLT platform, ensuring that data privacy is maintained even if unauthorized access is attempted.

In some arrangements, the method further comprises periodically updating the cardholder's biometric templates stored within the card's eSIM to maintain high accuracy in biometric verification and to adapt to changes in biometric features over time.

In some arrangements, the multi-factor authentication process includes verifying the proximity of the cardholder's registered mobile device to the transaction location using near-field communication (NFC) or Bluetooth Low Energy (BLE) technologies, thereby adding an additional layer of security to prevent unauthorized transactions.

In some arrangements, the transaction initiation token is configured to expire within a predetermined short time frame, typically less than a minute, to minimize the window for potential fraudulent use and enhance security.

In some arrangements, a neural network-based algorithm is used within the transaction fraud monitoring system, which continuously learns from new transaction data to improve its predictive accuracy in identifying fraudulent transactions.

In some arrangements, the identification logic incorporates real-time alerts to the cardholder via their mobile device if suspicious activity is detected, such as attempted transactions in two different locations within a timeframe that is physically impossible for the cardholder to have traveled.

In some arrangements, the method includes the ability for the cardholder to remotely disable the eSIM through a secure interface on their mobile device or through customer service, in the event that the card is lost or stolen, thereby preventing any further transactions.

In some arrangements, the method includes a recovery process for the cardholder to securely re-enable the eSIM and resume transactions after verifying their identity using advanced biometric data comparison against the biometric templates stored on the DLT.

In some arrangements, the DLT-based smart contracts are customized based on the cardholder's preferences and historical transaction patterns to automatically adjust security settings and transaction limits, providing a personalized transaction experience that dynamically adjusts to the cardholder's lifestyle and spending habits.

In some arrangements, a system for managing financial transactions uses a financial institution (FI) agnostic eSIM-enabled card capable of associating with multiple financial institutions. The system includes a physical transaction card embedded with a unique device identifier (UDI) and an embedded SIM (eSIM), where the eSIM is programmable to support dynamic association and disassociation with various financial institutions based on encrypted commands. The system also features a customer and card details registration module designed to securely capture and associate extensive customer details, including biometric identifiers, personal identification data, and banking preferences with the UDI and eSIM, employing advanced cryptographic techniques for data encryption and tokenization. Additionally, a distributed ledger technology (DLT) platform is robustly configured to log, manage, and securely store not only the details of the card and customer associations but also comprehensive transaction metadata from multiple FIs, utilizing hash functions and blockchain technology to ensure data integrity and confidentiality. A transaction initiation module integrates sophisticated authentication and authorization protocols from the respective FI, generating secure, time-limited transaction initiation tokens that facilitate transaction validation without exposing sensitive cardholder data. The system includes a fraud monitoring module equipped with advanced analytical tools, including machine learning algorithms and heuristic analysis, to scrutinize transaction metadata retrieved from the DLT for signs of anomalous activities or potential fraud patterns. An eSIM tracking module integrated with real-time geolocation tracking technology, such as GPS and network-based location services, combined with identification logic to detect and prevent the concurrent use of the card from geographically disparate locations, thereby enhancing security measures against cloning and other forms of fraud. Furthermore, an adaptive security management interface on the DLT platform dynamically adjusts security protocols and verification requirements based on transaction context, such as transaction size, location, and frequency. Finally, a real-time settlement module employs DLT-based smart contracts to automatically execute settlements of verified transactions, ensuring immediate processing and reducing the latency typically associated with cross-institutional financial transactions.

In some arrangements, the cryptographic techniques employed by the customer and card details registration module include using a dual-layer encryption strategy, wherein data is first encrypted at the field level followed by a second encryption layer applied to the entire data packet before transmission to the DLT platform.

In some arrangements, the system further comprises a data synchronization module that automatically updates cardholder information across all associated financial institutions upon any change in the cardholder's registered details or security preferences, ensuring consistency and accuracy of data stored on the DLT.

In some arrangements, the transaction initiation module is configured to use a predictive transaction verification process that pre-authenticates the cardholder based on typical transaction patterns and locations, thereby streamlining the transaction process for routine purchases.

In some arrangements, the system includes an anomaly detection module within the fraud monitoring module, specifically designed to trigger additional authentication steps or block transactions entirely if transaction patterns deviate significantly from the historical norm.

In some arrangements, the eSIM tracking module's geo-location tracking technology includes the capability to integrate data from both satellite GPS and terrestrial cellular network signals to provide enhanced location accuracy and reliability, especially in environments where GPS signals are weak or obstructed.

In some arrangements, the system further comprises a conditional transaction control module on the DLT platform that allows the cardholder to set specific conditions under which transactions are to be authorized or blocked, such as geographical limits, transaction value thresholds, or merchant type restrictions.

In some arrangements, the system includes a transaction feedback module that enables cardholders to receive immediate transaction confirmations and detailed transaction receipts directly on their registered mobile devices or via secure web portals, enhancing user experience and providing clear audit trails for personal accounting or dispute resolution.

In some arrangements, the customer and card details registration module further includes a voice recognition feature or signature, providing biometric verification capabilities by adding a voiceprint as an additional biometric identifier for authenticating the cardholder during transactions.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

BRIEF DESCRIPTION OF DRAWINGS

FIG. 5 describes another information security method for managing transactions using a financial institution (FI) agnostic eSIM-enabled card linked to multiple bank accounts across different financial institutions.

FIG. 6 is a class and system diagram for managing transactions uses a financial institution (FI) agnostic eSIM-enabled card capable of associating with multiple financial institutions showing sample interactions, interfaces, steps, functions, and components in accordance with one or more aspects of this disclosure.

DETAILED DESCRIPTION

Figure 1:
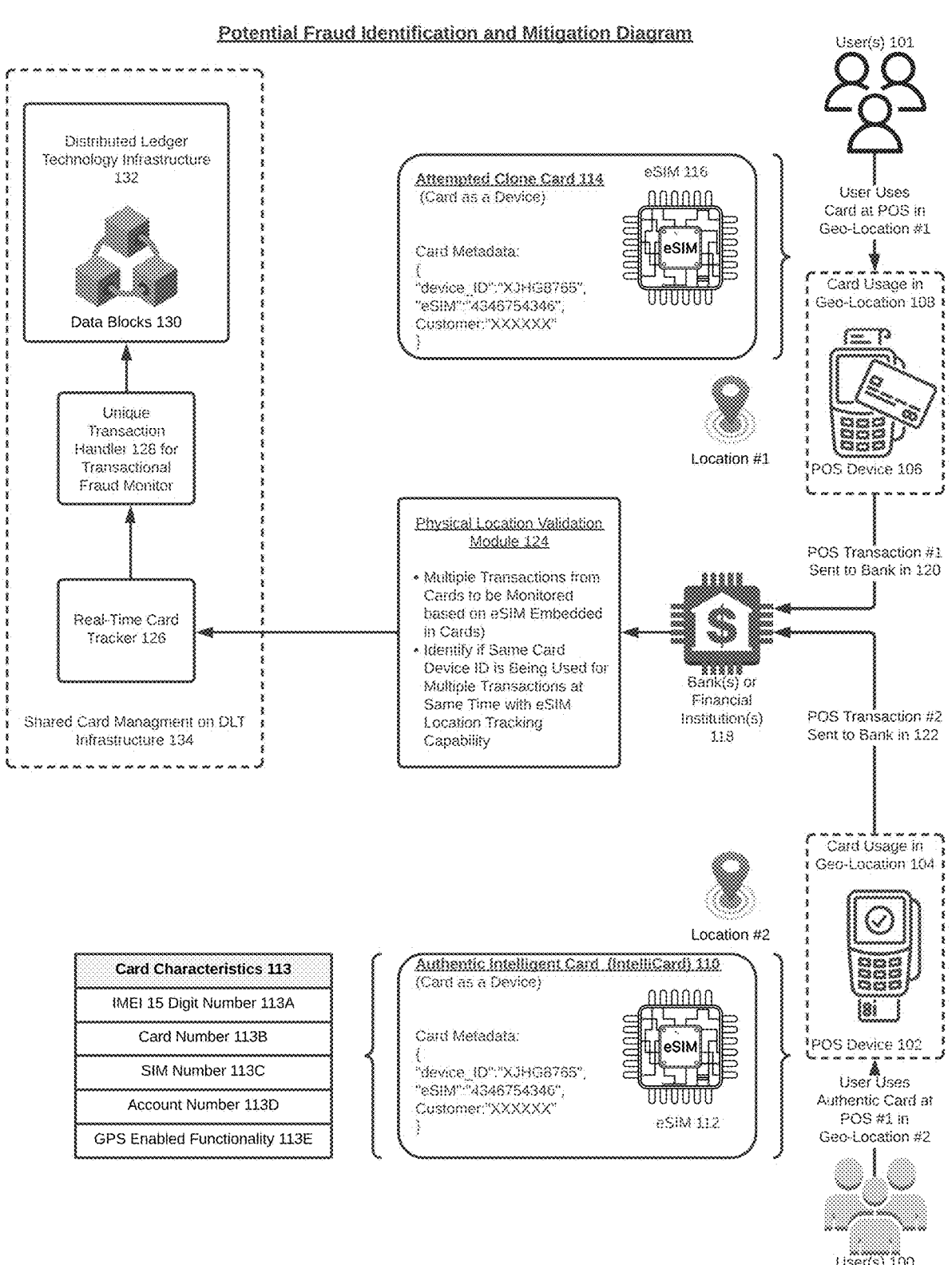
FIG. 1 illustrates a potential fraud identification and mitigation diagram for an information security system using an IntelliCard equipped with an eSIM and supported by Distributed Ledger Technology (DLT) to prevent fraud. It details the process from transaction initiation at POS devices through real-time monitoring and verification using various technological components to identify and mitigate potential fraud.

At a high level, the disclosed invention encompasses a revolutionary eSIM-enabled card system designed to operate independently of any specific financial institution (FI), enabling seamless and secure transactions across multiple bank accounts. The system leverages Distributed Ledger Technology (DLT) to ensure the security and integrity of financial transactions, providing a modern solution to the complexities of managing multiple banking relationships.

Central to the invention is the integration of an embedded eSIM within each card, allowing it to function as a stand-alone device that can dynamically connect with various FIs. This feature sets it apart from traditional bank cards by enabling a more flexible and secure approach to financial transactions. The eSIM facilitates direct, encrypted communication between the card and the banks' transaction systems through a DLT network, ensuring that each transaction is processed securely and efficiently.

The registration process for each card involves linking the eSIM and a unique device ID to the cardholder's identity and bank accounts (e.g., credit cards, debit cards, other accounts, etc.), all encrypted and stored on a secure, decentralized ledger. This establishes a verifiable and tamper-proof record of the cardholder's credentials and account links.

A key aspect of the system is its real-time geographical location tracking capability, which utilizes the eSIM to verify the card's physical presence at the transaction location, thereby significantly reducing the risk of fraud such as, for example, as would be present if a card and a clone are being used at or about the same time in different physical locations at point-of-sale terminals. The DLT framework also assigns a unique identifier and timestamp to each transaction, which helps prevent fraud related to cloned or stolen card details.

The transaction verification process within this system is fully automated. Once a transaction is authenticated, the system communicates with the bank to check fund availability and, if confirmed, proceeds to authorize and complete the transaction. This not only enhances security but also optimizes transaction speed and user convenience.

Furthermore, the system includes a centralized management feature that facilitates the use of the card across different FIs without the need for multiple cards, simplifying the user experience significantly. Additionally, the technology extends beyond physical cards to wearable devices like smartwatches and fitness bands, enabling these devices to carry out secure financial transactions through the embedded eSIM technology.

Overall, the eSIM-enabled card system described in this invention represents a significant innovation in information security technology. It provides a robust, secure, and highly adaptable platform for managing transactions across diverse landscapes, redefining the possibilities for personal financial management in a digital era. This system addresses the challenges of security, flexibility, and ease of use, making it a forward-looking solution for global financial interactions.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications—internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 illustrates a "Potential Fraud Identification and Mitigation" diagram outlining a comprehensive system designed to safeguard financial transactions by integrating advanced technological components. Central to this system is the IntelliCard, a sophisticated transaction card embedded with an eSIM that enables secure communication across financial networks.

At the outset, the diagram presents users, labeled 100 and 101, utilizing their IntelliCard at various point-of-sale (POS) devices, identified as 102 in the diagram. These POS devices capture transaction data, which includes the amount, time, and location of each transaction. This data is immediately sent to the respective financial institution's processing systems, initiating the transaction verification process.

The IntelliCard's unique capability comes from its embedded eSIM, which not only facilitates traditional transaction processes but also supports dynamic interactions with multiple financial institutions. This allows for real-time updates and verification, enhancing security and user convenience. Each card is assigned a unique Device ID and eSIM ID, integral for tracking and verifying transactions as depicted in the diagram.

The Distributed Ledger Technology (DLT) infrastructure, marked as 132 in the diagram, plays a pivotal role in this system. It securely records all transaction data across an immutable ledger, ensuring that each transaction is logged and can be audited to prevent and detect fraud. Data blocks, labeled 130, store these transactions in a tamper-proof manner, while a shared card management system on DLT, shown as 134, facilitates the centralized management of these records.

The Unique Transaction Handler (128) is tasked with monitoring for signs of fraudulent activity. It analyzes each transaction against historical data and patterns stored within the DLT to identify any anomalies that might suggest fraudulent behavior.

Concurrently, the Real-Time Card Tracker (126) uses the geographical data provided by the eSIM's GPS or other geo-locating functionality to monitor the physical location of each transaction. This is essential for detecting unusual patterns, such as the same card being used simultaneously in geographically distant locations, which would indicate a cloned card.

The Physical Location Validation Module (124) further enhances security by verifying the legitimacy of each transaction's location. It checks the geographical data against expected patterns and flags transactions occurring at outlier locations, which are often indicative of fraud.

The diagram also details the card's characteristics, including its IMEI number (113A), card number (113B), SIM number (113C), account number (113D), and GPS-enabled functionality (113E). These features are crucial for the system's ability to authenticate the card and verify transactions effectively.

In cases where a cloned card is suspected, the system identifies this through discrepancies in the device ID and location data. The feature, shown as 114 in the diagram, is designed to quickly isolate and address these issues, preventing potential fraud.

This sophisticated system not only detects and mitigates fraud but also provides a seamless and secure experience for users. It allows them to manage transactions across multiple banks and accounts efficiently, reducing the risk of data breaches and enhancing trust in digital financial transactions.

Moreover, the integration of eSIM technology with DLT ensures that each transaction is not only secure but also recorded in a way that is both accessible and immutable. This makes it easier for financial institutions to manage data, comply with regulations, and provide high levels of customer service.

The system's ability to track each transaction in real-time and compare it against a historical pattern database is a significant advancement in fraud prevention technology. It allows for immediate detection of anomalies and quick reaction to potential threats, thereby minimizing the risk of loss for both the institutions and their clients.

Finally, the diagram illustrates a future-focused approach to financial security, leveraging cutting-edge technology to address current and emerging threats in the financial sector. By integrating such technologies, the system described in the diagram not only enhances security but also sets a new standard for the protection of financial transactions in an increasingly digital world.

Figure 2:
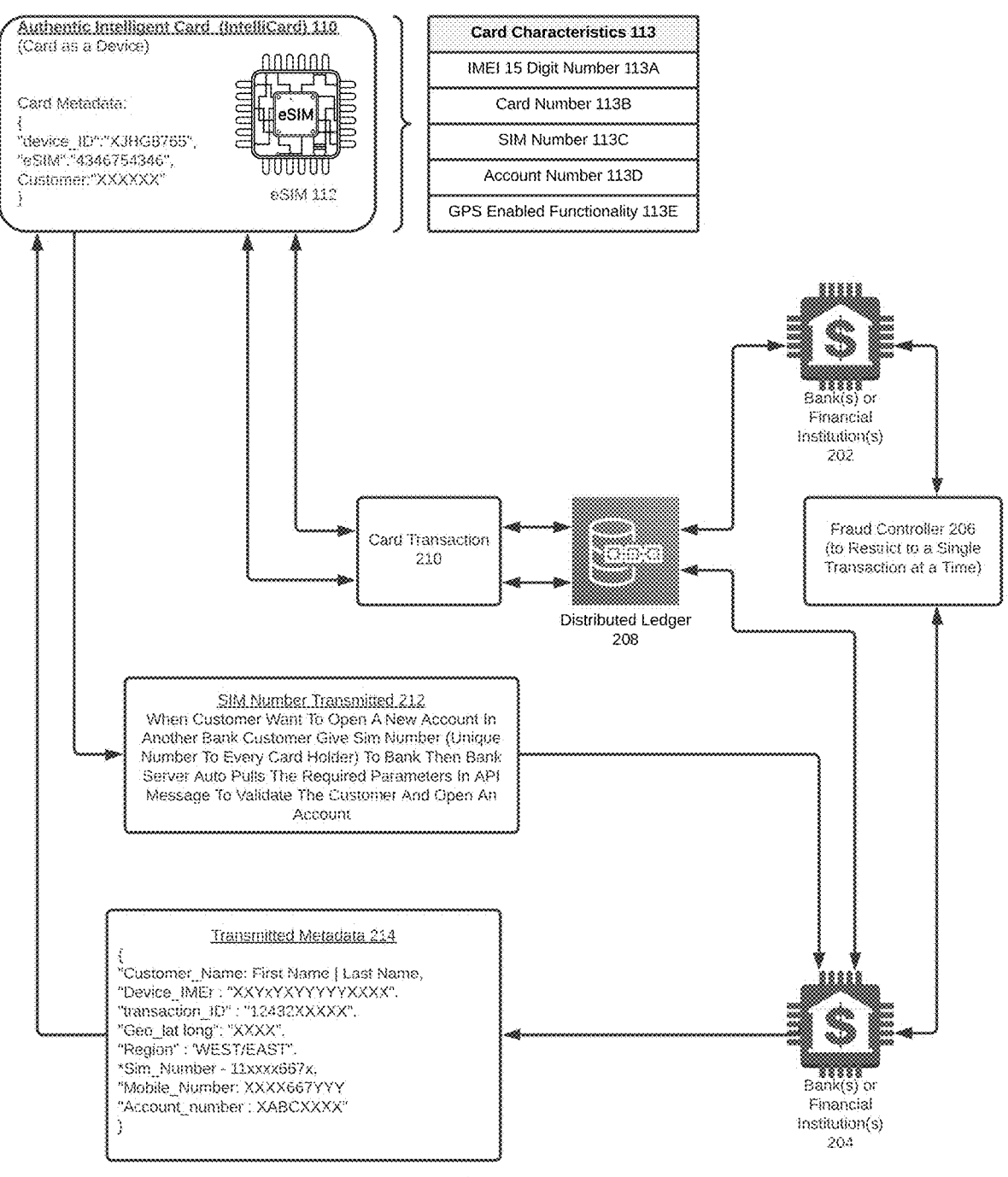
FIG. 2 illustrates an advanced information security system using the IntelliCard, an eSIM-enabled card, to securely manage transactions across multiple financial institutions via Distributed Ledger Technology (DLT). It details features like real-time transaction tracking, fraud control mechanisms to restrict multiple simultaneous transactions, and the ability to securely open new bank accounts by transmitting unique SIM numbers.

FIG. 2 details a highly advanced financial security system centered around the IntelliCard, an innovative eSIM-enabled transaction card designed to enhance transaction security across various financial institutions using Distributed Ledger Technology (DLT).

The system starts with the IntelliCard, labeled as element 110, which integrates multiple security features directly into the card. This card contains crucial information like the device ID and an eSIM identifier that help in validating transactions securely across different financial platforms without the need to exchange sensitive information.

At the initial stage, the IntelliCard (110) is associated with the customer's personal details, facilitating a secure connection to various financial services. This involves registering and activating the device metadata, including the device ID and eSIM identifier (elements 120 and 122), thus directly linking the card to the customer's identity and financial accounts. This registration process ensures that all transactions made with the IntelliCard are secure and personalized.

Once the card is activated, the details are logged into a DLT system (130), where a unique device number generated from the card and customer metadata is used to track transactions and ensure authenticity. This DLT infrastructure (132) acts as a secure repository, managing transaction records in a tamper-proof manner.

Each transaction initiated with the IntelliCard involves the respective bank performing authentication and authorization (140). This is achieved by generating a transaction initiation token (142), which is essential for conducting secure transactions. The token verifies that each transaction is recognized and sanctioned by the financial institution, enhancing transaction security.

A key component in preventing fraud is the Fraud Controller (206), designed to restrict the card to a single transaction at a time. This feature is crucial for preventing unauthorized multiple transactions that could indicate fraudulent activity, such as the use of cloned cards.

Furthermore, the transaction fraud monitor (150) accesses transaction metadata from the DLT (130) to authenticate each transaction individually. By analyzing transaction data against historical patterns and expected behavior, the system effectively identifies and mitigates potential fraud.

An essential capability of this system is the detection of simultaneous transactions at different locations using the eSIM's real-time tracking capabilities (160). If the card is used concurrently in multiple locations, security protocols (162) are triggered, blocking the transactions to prevent fraud. This monitoring is based on the unique device ID embedded in the IntelliCard, which helps in identifying potentially cloned cards or stolen card details.

In addition to these features, the IntelliCard includes comprehensive card characteristics (170) such as an IMEI number, card number, SIM number, account number, and GPS functionality. These elements are crucial for accurately identifying and authenticating the card at each transaction point.

The system also includes a feature for transmitting metadata (214) during transactions, which includes details such as the customer's name, device IMEI, transaction ID, geographical coordinates, region, SIM number, and mobile number. This metadata is essential for validating transactions and ensuring that all transaction details are accurately recorded and processed.

When a customer wishes to open a new account at a different bank, the SIM Number Transmitted feature (212) facilitates this process. The customer provides their SIM number—a unique identifier for each cardholder—to the new bank, which then automatically pulls the required parameters through an API message to validate the customer and open the account.

Another innovative aspect of this system is the real-time settlement capability (180), which allows for faster processing of payments, reducing the time between transaction initiation and completion. This feature ensures that payments are processed almost instantaneously, benefiting both the customer and the financial institutions involved.

Overall, this invention provides a secure and efficient method for managing financial transactions across multiple banks and accounts. By leveraging cutting-edge technology, the system ensures that each transaction is secure, authenticated, and processed in real time, significantly enhancing the security and efficiency of financial operations.

Figure 3:
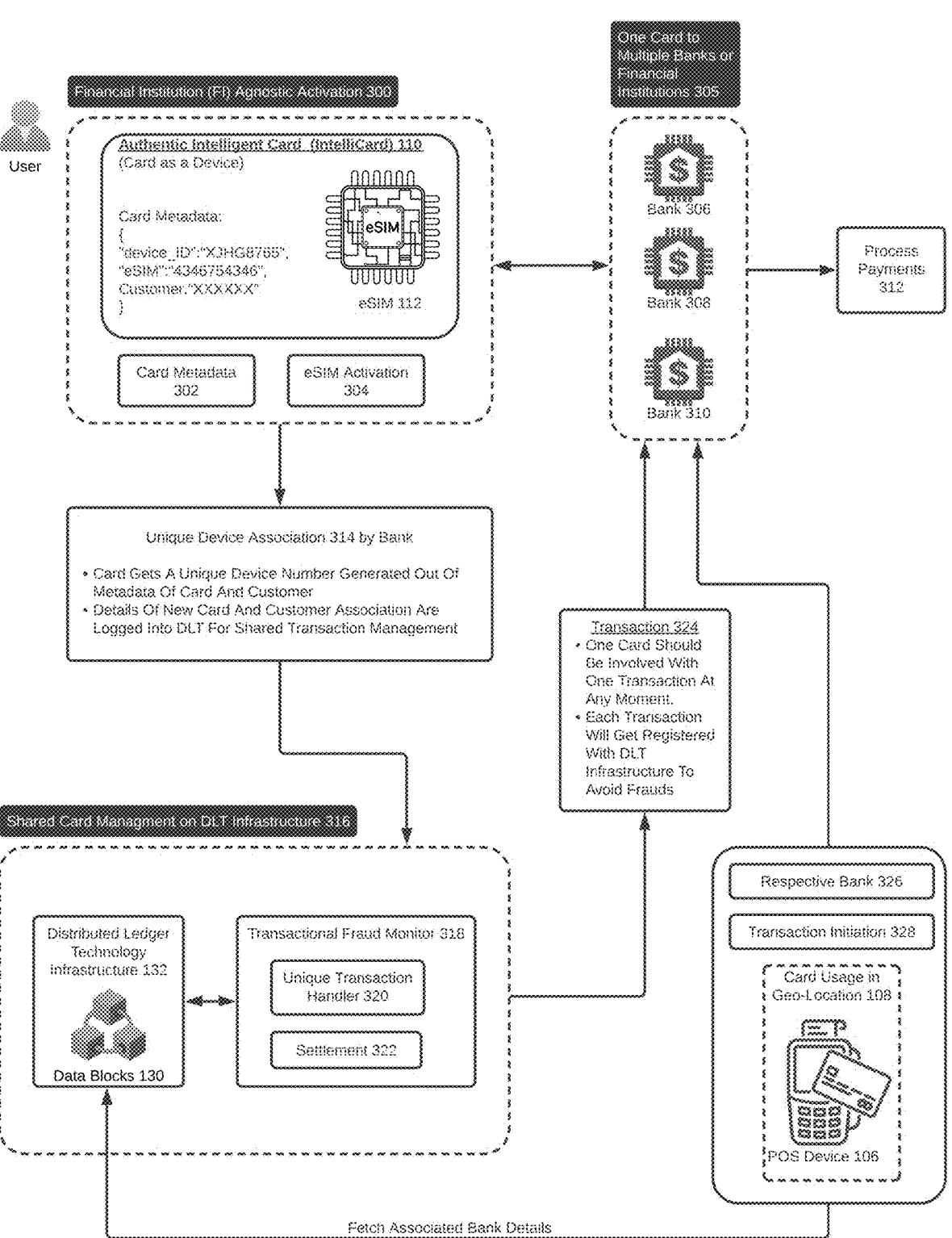
FIG. 3 depicts an advanced information security system utilizing the IntelliCard, an eSIM-enabled card integrated with Distributed Ledger Technology (DLT) to manage secure transactions across multiple financial institutions with financial institution agnostic activation such that one card can be utilized by multiple accounts at differing banks. This system enhances transaction security through unique device associations and real-time monitoring, ensuring that each card is involved in only one transaction at a time to prevent fraud.

FIG. 3 illustrates an advanced financial security system centered around the IntelliCard, an eSIM-enabled card designed to handle secure transactions across multiple financial institutions using Distributed Ledger Technology (DLT). This figure provides a depiction of the system's technological and operational components, ensuring that each transaction is conducted securely and efficiently.

At the core of the system is the IntelliCard, designated as 110, which is not merely a payment tool but a sophisticated smart device equipped with an embedded eSIM, indicated as 112. This setup allows the card to interact securely with multiple financial institutions, facilitating encrypted data exchanges crucial for the processing of secure transactions.

The process begins with the activation of the IntelliCard, represented by 300. During this phase, the card's essential metadata, including "device ID" (XJHG8765), "eSIM" (4346754346), and detailed customer information (XXXXXX), are securely linked to the cardholder's personal details. This initial step, covered in steps 302 for card metadata and 304 for eSIM activation, is critical in establishing the card's digital identity, enabling it to be used securely across different financial platforms.

Following the activation, the system performs a unique device association, shown as 314. During this step, the IntelliCard receives a unique device number generated from the combined metadata of the card and customer. This unique identifier is crucial as it allows for the precise tracking and management of the card's transactions across various financial platforms, thus enhancing security and providing a clear audit trail.

The details of the new card and customer association are then logged into the DLT for shared transaction management, as indicated at 316. This action ensures that all transaction records are securely stored in an immutable ledger within the DLT infrastructure, labeled as 132. This infrastructure comprises secure data blocks, denoted as 130, which form the backbone of the system's transaction management, ensuring all records are tamper-proof.

A critical component, the transactional fraud monitor, identified at 318, accesses the transaction metadata from the DLT to authenticate each transaction individually. This rigorous validation process is essential for detecting and preventing fraudulent activities, ensuring that each transaction adheres to established security protocols.

Additionally, a unique transaction handler, referred to at 320, processes each transaction independently, maintaining the integrity and security of the transaction process. This component is vital for preventing overlapping transactions and potential fraud that could arise from simultaneous transaction attempts.

The system also introduces a streamlined settlement process, highlighted at 322, which facilitates real-time transaction settlements. This feature is particularly valuable in today's financial landscape, where speed and efficiency in transaction processing are crucial.

The IntelliCard's ability to interface with multiple banks, as depicted at 305 and specifically with banks 306, 308, and 310, showcases its flexibility. This feature allows customers to manage multiple bank accounts with a single card, simplifying their banking experience and reducing the need for multiple physical cards.

An important security feature is introduced at 324, ensuring that the IntelliCard can only be involved in one transaction at any given moment. This restriction is critical for preventing fraud, such as the cloning of cards and their simultaneous unauthorized use at different locations.

Each transaction, as outlined at 324, is securely processed by the respective bank, shown as 326. The bank verifies and authorizes each payment based on the secure data provided by the IntelliCard and recorded in the DLT. This process ensures that every transaction is not only secure but also accurately recorded and easily verifiable, enhancing the overall security of the financial system.

Lastly, the system's design includes robust measures to ensure that each transaction is registered with the DLT infrastructure, as part of the process to avoid frauds. This registration is crucial for maintaining a secure and transparent record of all transactions, allowing for immediate verification and auditing if necessary.

Overall, FIG. 3 presents a highly secure, efficient, and innovative system that leverages cutting-edge technology to revolutionize the way financial transactions are managed across multiple institutions. This system not only enhances security but also provides a more integrated and seamless banking experience for users, demonstrating a forward-thinking approach to financial transaction management.

Figure 4:
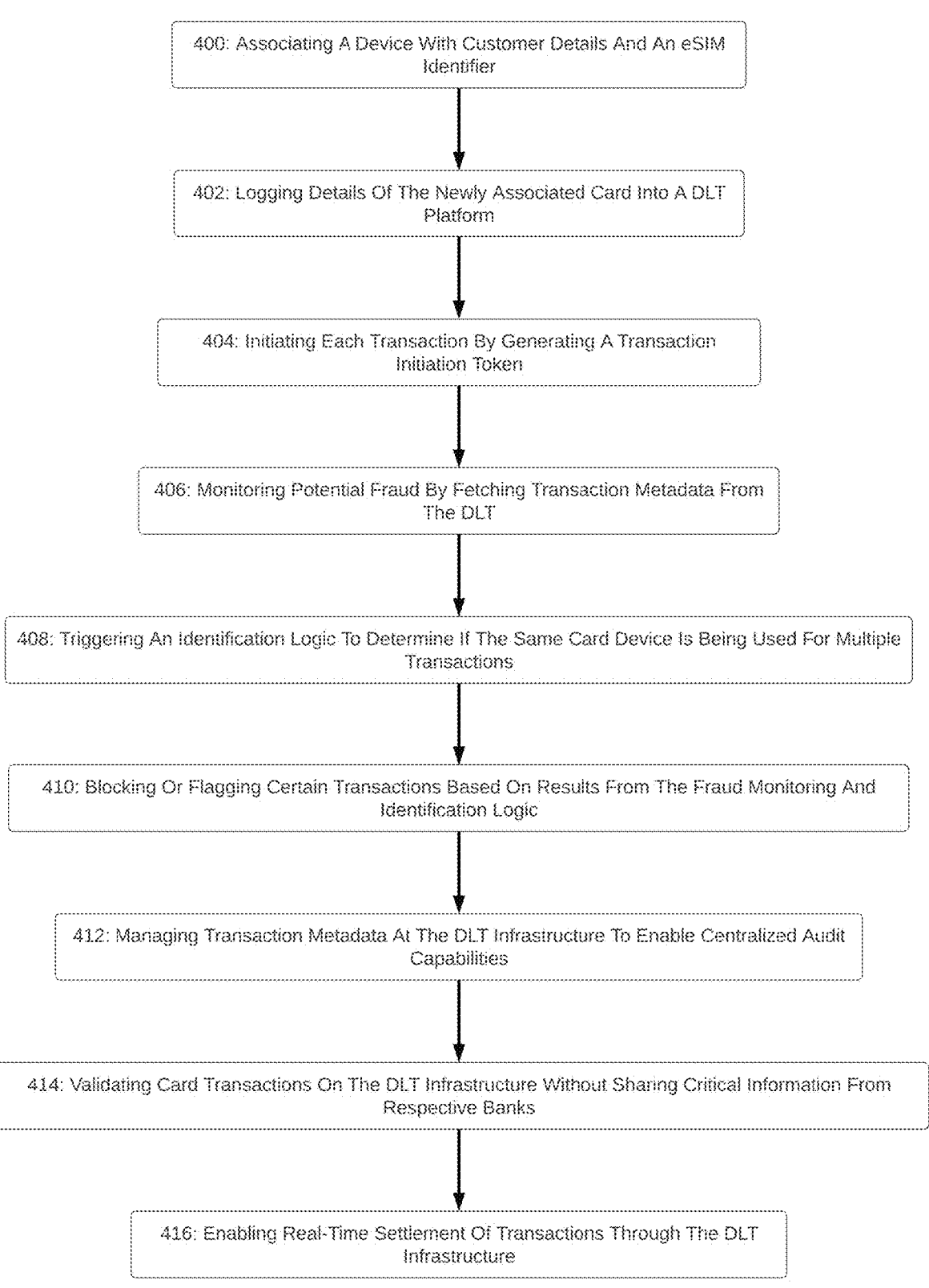
FIG. 4 describes a sample information security method for managing transactions using a financial institution (FI) agnostic eSIM-enabled card linked to multiple bank accounts across different financial institutions.

FIG. 4 describes a comprehensive method for managing financial transactions using a financial institution (FI) agnostic eSIM-enabled card linked to multiple bank accounts across different financial institutions. This innovative system leverages the embedded SIM (eSIM) technology and Distributed Ledger Technology (DLT) to enhance the security and efficiency of financial transactions.

The process begins by associating a device with customer details and an eSIM identifier (step 400). This involves securely linking the customer's identity with a unique device identifier (UDI), which is critical for establishing a secure and verifiable connection between the cardholder and their financial accounts.

Once the association is established, the details of the newly associated card, including a unique device number generated from the metadata of both the card and customer details, are logged into a DLT platform (step 402). This step is fundamental as it ensures that all registration and transaction data are securely recorded on a decentralized platform, enhancing data integrity and preventing tampering.

The transaction process itself starts with initiating each transaction by generating a transaction initiation token (step 404). This token is crucial for verifying the transaction's authenticity, as it follows authentication and authorization performed by the bank associated with the transaction.

To safeguard against fraud, the system continuously monitors potential fraudulent activities by retrieving transaction metadata from the DLT (step 406). It independently authenticates each transaction to ensure its uniqueness and security.

An identification logic is then triggered (step 408) to determine if the same card device is being used for multiple transactions simultaneously. This utilizes the eSIM's tracking capabilities embedded within the card, which is a critical security feature that helps in identifying and preventing potential fraud.

Depending on the results from the fraud monitoring and identification logic, certain transactions are either blocked or flagged (step 410). This is a proactive measure to prevent unauthorized transactions and enhance the security framework of the financial transaction system.

Furthermore, the system manages transaction metadata on the DLT infrastructure (step 412) to enable centralized audit capabilities. This feature supports effective dispute management by providing a transparent and immutable record of all transactions.

A significant security enhancement is achieved by validating card transactions directly on the DLT infrastructure without sharing sensitive information from the respective banks (step 414). This step not only secures the transaction data but also maintains customer privacy by minimizing exposure to sensitive financial details.

Finally, the method enables real-time settlement of transactions through the DLT infrastructure (step 416), which significantly reduces transaction delays and enhances the efficiency of the payment processing system. This feature is crucial in modern financial environments where speed and accuracy are paramount.

Overall, FIG. 4 illustrates a robust and secure method for managing financial transactions across multiple financial institutions using an eSIM-enabled card. This method ensures high security, real-time processing, and efficient management of financial transactions, thereby addressing many of the challenges faced in the current financial transaction systems.

FIG. 5 outlines a comprehensive method for managing financial transactions utilizing an FI-agnostic eSIM-enabled card associated with multiple bank accounts across different financial institutions. The depiction begins with step 500, where a device equipped with a unique device ID is associated with customer details and an eSIM identifier, activating the device-based card for enabling transactions. Subsequently, step 502 involves logging details of this association, including the unique device number derived from the card and customer metadata, into a Distributed Ledger Technology (DLT) platform, setting the stage for shared transaction management.

The flow then advances to step 504, where transactions are initiated by generating a transaction initiation token after the required authentication and authorization by the respective bank linked to the transaction on the same card. The procedure progresses to step 506, emphasizing the monitoring of potential fraud by fetching transaction metadata from the DLT and authenticating each unique transaction independently. This step is crucial for identifying and mitigating fraudulent activities effectively.

Step 508 introduces an identification logic that is triggered to check if the same card device is used for multiple transactions simultaneously, leveraging the eSIM tracking capabilities embedded within the card. If anomalies are detected, step 510 allows for the blocking or flagging of certain transactions based on the outcomes from the fraud monitoring and identification logic.

The method further includes step 512, which involves managing transaction metadata at the DLT infrastructure. This enables centralized audit capabilities, crucial for effective dispute management. Transactions are validated in step 514 on the DLT infrastructure without sharing critical information from respective banks, thereby enhancing security and privacy. Step 516 concludes this part of the process by enabling real-time settlement of transactions through the DLT infrastructure, which leads to faster payment processing and reduced transaction delays.

In some arrangements, as detailed in steps 518 and beyond, additional security measures include the use of a cryptographic registration process employing a public-private key encryption scheme to secure the cardholder's biometric and personal data before storing it on the DLT platform, as indicated in step 518. This ensures that data privacy is maintained even if unauthorized access is attempted. Periodic updates to the cardholder's biometric templates stored within the card's eSIM are conducted in step 520 to maintain high accuracy in biometric verification and adapt to changes in biometric features over time.

Step 522 addresses the use of near-field communication (NFC) or Bluetooth Low Energy (BLE) technologies to verify the proximity of the cardholder's registered mobile device to the transaction location, adding an extra layer of security. The transaction initiation token is configured in step 524 to expire within a short time frame, typically less than a minute, minimizing the window for potential fraudulent use and enhancing security.

A neural network-based algorithm used in the transaction fraud monitoring system, depicted in step 526, continuously learns from new transaction data to improve its predictive accuracy in identifying fraudulent transactions. Real-time alerts to the cardholder via their mobile device are incorporated in step 528 if suspicious activity is detected, such as attempted transactions in two different locations within a timeframe that is physically impossible for the cardholder to have traveled.

Further enhancing security, step 530 provides the cardholder with the ability to remotely disable the eSIM through a secure interface on their mobile device or through customer service in the event that the card is lost or stolen. This prevents any further transactions. Step 532 includes a recovery process for the cardholder to securely re-enable the eSIM and resume transactions after verifying their identity using advanced biometric data comparison against the biometric templates stored on the DLT.

Finally, step 534 customizes DLT-based smart contracts based on the cardholder's preferences and historical transaction patterns. This adjustment of security settings and transaction limits offers a personalized transaction experience that dynamically adjusts to the cardholder's lifestyle and spending habits. This entire method not only enhances the efficiency and security of financial transactions but also integrates advanced technological measures to safeguard and streamline the transaction process across various banking platforms.

FIG. 6 illustrates a sophisticated class diagram for a information security system designed to manage transactions using a financial institution (FI) agnostic eSIM-enabled card, capable of associating with multiple financial institutions and multiple banking accounts including credit, debit, checking, savings, etc. The diagram showcases various interconnected modules, each responsible for distinct aspects of the transaction management process.

The central element of the system, labeled as "Physical-TransactionCard" (601), includes attributes such as a Unique Device Identifier (UDI) and a programmable eSIM, highlighting its capability to interact seamlessly with different banking systems and technological platforms. This card forms the foundation upon which the other modules operate, ensuring secure and versatile transaction capabilities across various financial institutions.

Adjacent to the PhysicalTransactionCard is the "RegistrationModule" (602), responsible for collecting and storing essential customer details, including biometrics and banking preferences. This module also handles voiceprint data, indicating a sophisticated level of security and personalization, enabling it to support robust identity verification processes which are crucial for safeguarding user data and preventing unauthorized access.

The "DLTPlatform" (604) represents a critical component of the system, tasked with storing and managing card data, customer data, transaction metadata, and features an adaptive security interface. This module ensures that all transaction data is maintained on a secure, distributed ledger, facilitating transparent and immutable record-keeping that enhances trust and reliability in the transaction process.

Progressing through the system, the "TransactionInitiationModule" (606) is equipped with authentication protocols and predictive verification mechanisms. These features enable the module to authenticate transaction requests accurately and predict potential security threats in real-time, thereby preventing fraudulent transactions and ensuring a secure transaction environment.

The "FraudMonitoringModule" (608) utilizes machine learning and heuristic analysis to monitor transactions continuously. This module's capabilities suggest a dynamic approach to fraud detection, where ongoing learning from transaction patterns enhances its ability to detect and respond to anomalies effectively.

A notable inclusion in the diagram is the "ESIMTrackingModule" (610), which uses GPS and network-based location services to track the physical location of the transaction card. This tracking capability is vital for verifying transaction authenticity and ensuring that the card is not being misused at different locations simultaneously.

The "RealTimeSettlementModule" (612) employs DLT-based smart contracts to facilitate the immediate settlement of transactions. This module significantly reduces transaction delays, streamlining the process and improving the user experience by ensuring that transactions are processed swiftly and securely.

The "DataSynchronizationModule" (614) is tasked with maintaining up-to-date cardholder information across different systems, ensuring consistency and accuracy of data across all transaction touchpoints. This synchronization is crucial for maintaining the integrity of the transaction process and ensuring that all stakeholders have access to the most current data.

Further, the "ConditionalTransactionControlModule" (616) allows for setting specific transaction conditions, providing an additional layer of control and customization for the cardholder. This module enhances security by enabling users to define conditions under which transactions are allowed or blocked, adapting to the user's unique transaction behavior and preferences.

Finally, the "TransactionFeedbackModule" (618) focuses on providing transaction confirmations and detailed receipts. This feedback mechanism is essential for providing transparency to the cardholder, allowing them to verify and reconcile transactions effectively.

Overall, FIG. 6 details a robust, multi-faceted system designed to enhance the security, efficiency, and user control of financial transactions across multiple financial institutions through an FI-agnostic eSIM-enabled card. This system not only addresses security concerns but also leverages advanced technology to adapt to user needs and evolving security challenges.

Figure 7:
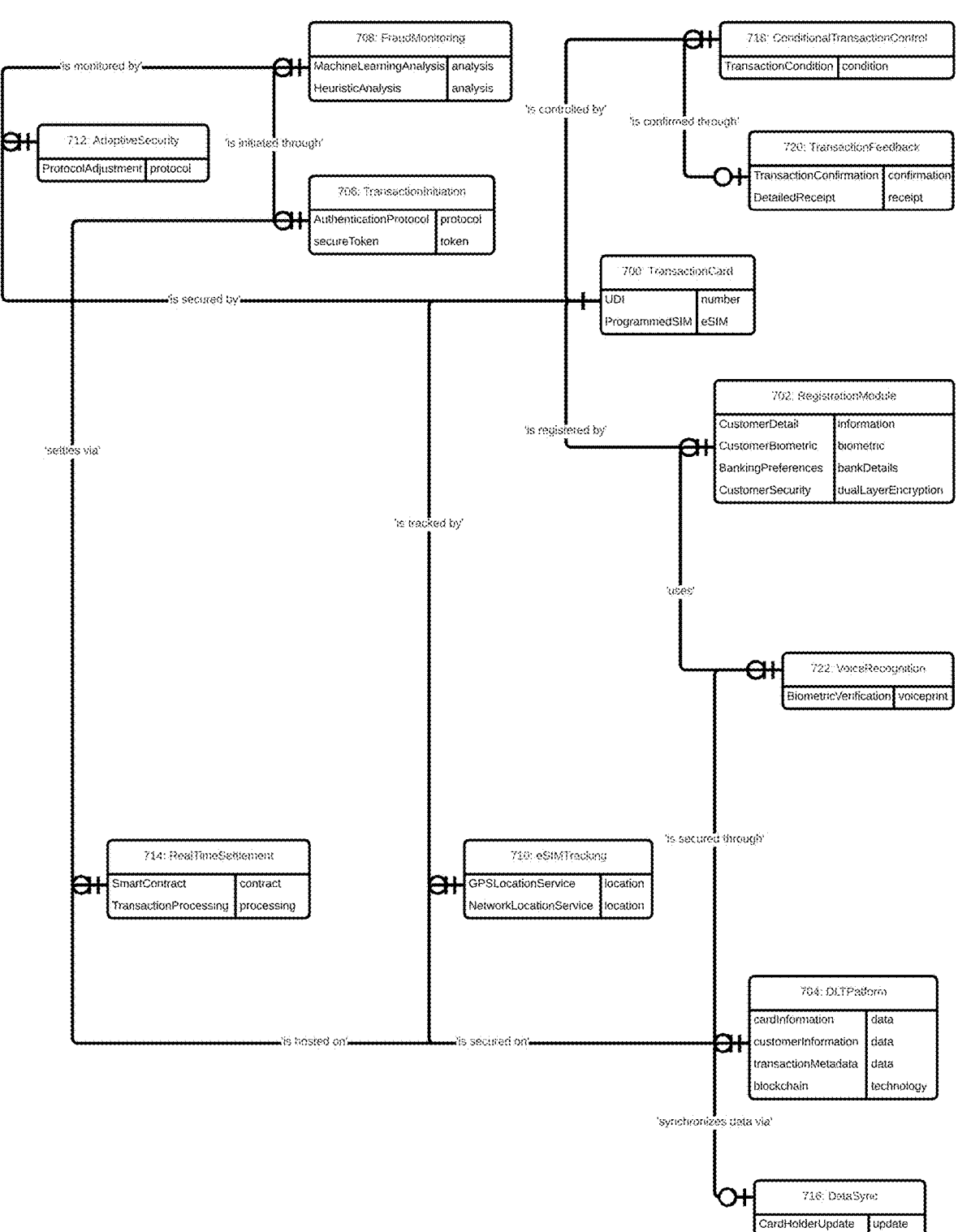
FIG. 7 is an entity relationship and system diagram for managing transactions uses a financial institution (FI) agnostic eSIM-enabled card capable of associating with multiple financial institutions showing sample interactions, interfaces, steps, functions, and components in accordance with one or more aspects of this disclosure.

FIG. 7 provides an elaborate system diagram that delineates a multifaceted approach for managing financial transactions through the use of a transaction card, described here as the "TransactionCard" (700). This card is embedded with a Unique Device Identifier (UDI) and a programmed SIM eSIM, indicating its capability to operate across various platforms while maintaining a secure connection to necessary financial services.

The "RegistrationModule" (702) serves as the entry point for user data, where customer detail information, biometric data, banking preferences, and a robust dual-layer encryption system are registered. This module ensures that all personal and financial information provided by the user is securely encrypted, thereby safeguarding privacy and integrity right from the onset.

Central to the system's infrastructure is the "DLTPlatform" (704), which securely hosts card information, customer information, and transaction metadata using advanced blockchain technology. This setup not only secures the data but also ensures its immutability and traceability, critical features for maintaining trust and accountability in financial transactions.

Transaction initiation is handled by the "TransactionInitiation" module (706), which utilizes secure authentication protocols and generates secure tokens for transaction validation. This process ensures that each transaction is initiated with a high level of security, reducing the risk of fraud and unauthorized access.

The "FraudMonitoring" module (708) employs both machine learning analysis and heuristic analysis to monitor ongoing transactions dynamically. This dual approach allows the system to learn from each transaction, enhancing its ability to detect unusual patterns or potential security threats more effectively over time.

For real-time location tracking, the "eSIMTracking" module (710) incorporates GPS and network-based location services. This functionality is crucial for confirming the physical presence of the transaction card at the transaction location, adding an additional layer of security by verifying the transaction's legitimacy based on geographical data.

Adjustments to security protocols are managed by the "AdaptiveSecurity" module (712), which can modify security measures in real-time based on detected threats or vulnerabilities. This adaptability ensures that the security system remains robust against evolving threats.

The "RealTimeSettlement" module (714) utilizes smart contracts for transaction processing, enabling rapid and secure transaction settlements. This module leverages the efficiency of blockchain technology to reduce transaction times dramatically, enhancing user satisfaction and operational efficiency.

Data synchronization across the system is facilitated by the "DataSync" module (716), which regularly updates cardholder information to ensure all records are consistent and current across the system, essential for maintaining the accuracy of transaction records and user profiles.

The "ConditionalTransactionControl" module (718) allows for setting specific transaction conditions, which can dynamically control transaction execution based on predefined rules or criteria, adding a layer of customization and security by tailoring transactions to meet specific risk thresholds or user preferences.

Feedback on transactions is provided by the "TransactionFeedback" module (720), which ensures that every transaction is confirmed with the user through detailed receipts, offering transparency and a detailed audit trail for each transaction.

Finally, the "VoiceRecognition" module (722) adds an innovative layer of security by using biometric verification based on voiceprints. This feature integrates an additional biometric layer, enhancing security by confirming the identity of the user through unique voice patterns.

Overall, FIG. 7 illustrates a highly integrated and secure system for managing financial transactions using an FI-agnostic eSIM-enabled card, emphasizing security, efficiency, and user control through various advanced technological measures and protocols.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information security method for preventing fraudulent transactions using a financial institution (FI) agnostic eSIM-enabled card associated with multiple bank accounts across different FIs, the method comprising:

associating a device-based card, having a unique device ID, with customer details and an embedded SIM (eSIM) identifier, where association activates the device-based card to enable transactions;

logging details of the device-based card as newly associated, including the unique device ID generated from metadata of the device-based card and customer details, into a distributed ledger technology (DLT) infrastructure for shared transaction management;

initiating each transaction by generating a transaction initiation token following authentication and authorization performed by a respective bank associated with the transaction on the device-based card, wherein the transaction initiation token is configured to expire within a predetermined short time frame that is less than a minute to minimize a window for potential fraudulent use;

monitoring potential fraud by fetching transaction metadata from the DLT and authenticating each unique transaction independently;

triggering an identification logic to determine if the device-based card is being used for multiple transactions at different geo-locations, utilizing eSIM tracking capability embedded within the device-based card to detect concurrent use from geographically disparate locations within a timeframe physically impossible for the cardholder to travel between using a neural network-based algorithm within the identification logic, which continuously learns from new transaction data to improve its predictive accuracy in identifying fraudulent transactions;

blocking fraudulent transactions based on results from the identification logic;

managing transaction metadata at the DLT infrastructure to enable centralized audit capabilities for effective dispute management;

validating card transactions on the DLT infrastructure without sharing critical information from respective banks, thereby enhancing security and privacy; and enabling real-time settlement of transactions through the DLT infrastructure, leading to faster payment processing and reduced transaction delays, wherein the device is the FI agnostic eSIM-enabled card associated with the multiple bank accounts across the different FIs and the multiple bank accounts are for credit card accounts or debit card accounts, and wherein the DLT infrastructure uses smart contracts customized based on cardholder preferences and historical transaction patterns for the real-time settlement.

2. The method of claim 1, wherein a cryptographic registration process is used in performing said activation and includes use of a public-private key encryption scheme to secure cardholder biometric and personal data before storing it on the DLT infrastructure, ensuring that data privacy is maintained even if unauthorized access is attempted.

3. The method of claim 2, further comprising periodically updating cardholder's biometric templates stored within the eSIM on the card to maintain high accuracy in biometric verification and to adapt to changes in biometric features over time.

4. The method of claim 3 further comprising performing multi-factor authentication, wherein the multi-factor authentication includes verifying a proximity of a registered mobile device for the cardholder to the transaction location using near-field communication (NFC) or Bluetooth Low Energy (BLE) technologies, thereby adding an additional layer of security to prevent unauthorized transactions.

5. The method of claim 1, wherein the identification logic incorporates real-time alerts to the cardholder via the registered mobile device if suspicious activity is detected, including attempted transactions in two different locations within a timeframe that is physically impossible for the cardholder to have traveled.

6. The method of claim 5, further comprising remotely disabling the eSIM through a secure interface on the registered mobile device or through customer service, if the card is lost or stolen, thereby preventing any further transactions.

7. The method of claim 6, including a recovery process for the cardholder to securely re-enable the eSIM and resume transactions after verifying their identity using advanced biometric data comparison against biometric templates stored on the DLT infrastructure.

8. The method of claim 7, wherein smart contracts in the DLT infrastructure are customized based on preferences of the cardholder and historical transaction patterns to automatically adjust security settings and transaction limits, providing a personalized transaction experience that dynamically adjusts to lifestyle and spending habits of the cardholder.

9. An information security system for preventing fraudulent transactions using a financial institution (FI) agnostic eSIM-enabled card capable of associating with multiple financial institutions, the system comprising:

a physical transaction card embedded with a unique device identifier (UDI) and an embedded SIM (eSIM), where the eSIM is programmable to support dynamic association and disassociation with various financial institutions based on encrypted commands;

a customer and card details registration module designed to securely capture and associate extensive customer details including biometric identifiers, personal identification data, and banking preferences with the UDI and eSIM, employing advanced cryptographic techniques for data encryption and tokenization, wherein the customer and card details registration module further includes a voice recognition feature, enhancing biometric verification capabilities by adding a voiceprint as an additional biometric identifier for authenticating the cardholder during transactions;

a distributed ledger technology (DLT) platform, configured to log, manage, and securely store not only card details and customer associations but also comprehensive transaction metadata from multiple FIs, utilizing hash functions and blockchain technology to ensure data integrity and confidentiality;

a transaction initiation module that integrates sophisticated authentication and authorization protocols from the respective FI, generating secure, time-limited transaction initiation tokens that facilitate transaction validation without exposing sensitive cardholder data, wherein the transaction initiation tokens are configured to expire within a predetermined short time frame that is less than a minute to minimize a window for potential fraudulent use;

a fraud monitoring module equipped with advanced analytical tools, including machine learning algorithms and heuristic analysis, to scrutinize transaction metadata retrieved from the DLT for signs of anomalous activities or potential fraud patterns;

an eSIM tracking module integrated with real-time geolocation tracking technology, such as GPS and network-based location services, combined with identification logic to detect and prevent concurrent use of the card from geographically disparate locations within a timeframe physically impossible for the cardholder to travel between using a neural network-based algorithm within the identification logic, which continuously learns from new transaction data to improve its predictive accuracy in identifying fraudulent transactions, thereby enhancing security measures against cloning and other forms of fraud;

an adaptive security management interface on the DLT platform that dynamically adjusts security protocols and verification requirements based on transaction context, including transaction size, location, and frequency; and a real-time settlement module that employs DLT-based smart contracts to automatically execute settlements of verified transactions, ensuring immediate processing and reducing latency typically associated with cross-institutional financial transactions, wherein the smart contracts are customized based on cardholder preferences and historical transaction patterns.

10. The system of claim 9, where cryptographic techniques employed by the customer and card details registration module include employing a dual-layer encryption strategy, wherein data is first encrypted at field level followed by a second encryption layer applied to entire data packets before transmission to the DLT platform.

11. The system of claim 10, further comprising a data synchronization module that automatically updates cardholder information across all associated financial institutions upon any change in registered details of the cardholder or security preferences, ensuring consistency and accuracy of data stored on the DLT.

12. The system of claim 11, wherein the transaction initiation module is configured to use a predictive transaction verification process that pre-authenticates the cardholder based on typical transaction patterns and locations, thereby streamlining a transaction process for routine purchases.

13. The system of claim 12, including an anomaly detection module within the fraud monitoring module, specifically designed to trigger additional authentication steps or block transactions entirely if transaction patterns deviate significantly from a historical norm.

14. The system of claim 13, wherein the eSIM tracking module's geolocation tracking technology includes the capability to integrate data from both satellite GPS and terrestrial cellular network signals to provide enhanced location accuracy and reliability, especially in environments where GPS signals are weak or obstructed.

15. The system of claim 14, further comprising a conditional transaction control module on the DLT platform that allows the cardholder to set specific conditions under which transactions are to be authorized or blocked, including geographical limits, transaction value thresholds, or merchant type restrictions.

16. The system of claim 15, including a transaction feedback module that enables cardholders to receive immediate transaction confirmations and detailed transaction receipts directly on their registered mobile devices or via secure web portals, enhancing user experience and providing clear audit trails for personal accounting or dispute resolution.

17. An information security method for preventing fraudulent transactions using a financial institution (FI) agnostic eSIM-enabled card associated with multiple bank accounts across different FIs, the method comprising:

associating a device, having a unique device ID, with customer details and an embedded SIM (eSIM) identifier, where the association activates the card to enable transactions;

logging details of the card as newly associated, including the unique device ID generated from metadata of the card and customer details, into a distributed ledger technology (DLT) infrastructure for shared transaction management;

initiating each transaction by generating a transaction initiation token following authentication and authorization performed by a respective bank associated with the transaction on the card, wherein the transaction initiation token is configured to expire within a predetermined short time frame that is less than a minute to minimize a window for potential fraudulent use;

monitoring potential fraud by fetching transaction metadata from the DLT and authenticating each unique transaction independently;

triggering an identification logic to determine if the card is being used for multiple transactions simultaneously, utilizing eSIM tracking capability embedded within the card to detect concurrent use from geographically disparate locations within a timeframe physically impossible for the cardholder to travel between using a neural network-based algorithm within the identification logic, which continuously learns from new transaction data to improve its predictive accuracy in identifying fraudulent transactions;

blocking or flagging certain transactions based on results from the fraud monitoring and identification logic;

managing transaction metadata at the DLT infrastructure to enable centralized audit capabilities for effective dispute management;

validating card transactions on the DLT infrastructure without sharing critical information from respective banks, thereby enhancing security and privacy; and enabling real-time settlement of transactions through the DLT infrastructure, leading to faster payment processing and reduced transaction delays, wherein the device is the FI agnostic eSIM-enabled card associated with the multiple bank accounts across the different FIs and the multiple bank accounts are for credit card accounts or debit card accounts, and wherein the DLT infrastructure uses smart contracts customized based on cardholder preferences and historical transaction patterns for the real-time settlement.

* * * * *